(12) United States Patent
Ahn et al.

(10) Patent No.: US 7,928,174 B2
(45) Date of Patent: Apr. 19, 2011

(54) ORGANOSILICON FUNCTIONAL BORON AMINE CATALYST COMPLEXES AND CURABLE COMPOSITIONS MADE THEREFROM

(75) Inventors: Dongchan Ahn, Midland, MI (US);
Mohamed Mustafa, Midland, MI (US);
Patricia Olney, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 843 days.

(21) Appl. No.: 11/791,942

(22) PCT Filed: Dec. 13, 2005

(86) PCT No.: PCT/US2005/044947
§ 371 (c)(1),
(2), (4) Date: May 30, 2007

(87) PCT Pub. No.: WO2006/073695
PCT Pub. Date: Jul. 13, 2006

(65) Prior Publication Data
US 2008/0050552 A1    Feb. 28, 2008

Related U.S. Application Data

(60) Provisional application No. 60/641,353, filed on Jan. 4, 2005.

(51) Int. Cl.
*C08F 4/52* (2006.01)
(52) U.S. Cl. ........ 526/198; 526/195; 526/196; 526/197; 502/158; 502/167; 502/202; 502/232; 428/343; 428/355 EN; 428/446; 428/447; 428/500
(58) Field of Classification Search .................. 526/195, 526/196, 197, 198; 502/158, 167, 202, 232; 428/343, 355 EN, 446, 447, 500
See application file for complete search history.

(56) References Cited

U.S. PATENT DOCUMENTS

| | | | |
|---|---|---|---|
| 2,676,182 A | 4/1954 | Daudt et al | |
| 3,275,611 A | 9/1966 | Mottus et al. | |
| 4,100,141 A | * 7/1978 | O'Sullivan | 526/301 |
| 4,584,355 A | 4/1986 | Blizzard et al. | |
| 4,585,836 A | 4/1986 | Homan et al. | |
| 4,591,622 A | 5/1986 | Blizzard et al. | |
| 5,160,928 A | 11/1992 | Rigat-Esselin et al. | |
| 5,310,835 A | 5/1994 | Skoultchi et al. | |
| 5,539,070 A | 7/1996 | Zharov et al. | |
| 5,686,544 A | 11/1997 | Pocius | |
| 5,929,194 A | 7/1999 | Woo et al. | |
| 6,361,716 B1 | 3/2002 | Kleyer et al. | |
| 6,534,581 B1 | 3/2003 | Kleyer et al. | |
| 6,620,515 B2 | 9/2003 | Feng et al. | |
| 6,706,831 B2 | 3/2004 | Sonnenschein et al. | |
| 6,762,260 B2 | 7/2004 | Sonnenschein et al. | |
| 6,777,512 B1 | 8/2004 | Sonnenschein et al. | |
| 6,806,330 B1 | 10/2004 | Sonnenschein et al. | |

FOREIGN PATENT DOCUMENTS

| | | |
|---|---|---|
| WO | WO 2005/017005 A1 | 2/2005 |
| WO | WO 2005/017006 A1 | 2/2005 |
| WO | WO 2005/044867 A1 | 5/2005 |

OTHER PUBLICATIONS

McMullen et al., Inorganic Chemistry 9 (1970) 2291-2295.*
Soderquiest, John A., and Brown, Herbert C., "Convenient and Regiospecific Route to Functionalized Organosilanes through the Hydroboration of Alkenylsilanes," J. of Org. Chem., 1980, vol. 45, pp. 3571-3578.

* cited by examiner

*Primary Examiner* — Roberto Rabago
(74) *Attorney, Agent, or Firm* — Erika Takeuchi

(57) ABSTRACT

Organosilicon functional boron amine catalyst complexes have an organosilicon functional organoborane portion of the complex that contains at least one silicon atom. The complexes can be used as components in curable compositions containing (i) a free radical polymerizable monomer, oligomer or polymer; (ii) the organosilicon functional boron amine catalyst complex; and (iii) an amine reactive compound having amine reactive groups. The curable compositions may contain a component capable of generating a gas, as well as various other optional ingredients. These curable compositions can be used as rubbers, tapes, adhesives, protective coatings, thin films, thermoplastic monolithic molded parts, thermosetting monolithic molded parts, sealants, foams, gaskets, seals, o-rings, pressure sensitive adhesives, die attachment adhesives, lid sealants, encapsulants, potting compounds, conformal coatings, and electronic components. The compositions can also be used in composite articles of manufacture in which substrates are coated or bonded together with the composition and cured, such as in connectors, diving masks, or other integrally bonded parts.

20 Claims, No Drawings

ORGANOSILICON FUNCTIONAL BORON AMINE CATALYST COMPLEXES AND CURABLE COMPOSITIONS MADE THEREFROM

CROSS REFERENCE TO RELATED APPLICATIONS

This application is a U.S. national stage filing under 35 U.S.C. §371 of PCT Application No. PCT/US05/044947 filed on 13 Dec. 2005, currently pending, which claims the benefit of U.S. Provisional Patent Application No. 60/641,353 filed 4 Jan. 2005 under 35 U.S.C. §119 (e). PCT Application No. PCT/US05/044947 and U.S. Provisional Patent Application No. 60/641,353 are hereby incorporated by reference.

DESCRIPTION

The invention is directed to organosilicon functional boron amine catalyst complexes that are suitable as initiators for curing free-radical polymerizable compounds. Curing is defined herein as a chemical reaction such as polymerization or crosslinking that results in an increase in average molecular weight of the polymerizable compound such that the composition thickens or hardens.

The invention is also directed to curable compositions made from the organosilicon functional boron amine catalyst complex. The invention is further directed to a composite article that includes the curable composition and at least one substrate. An additional feature of the invention relates to organosilicon compositions that can be cured at low temperatures wherein the curable composition contains a free radical polymerizable organopolysiloxane compound.

Yet further, the invention is directed to methods of making composite articles in which the curable composition is in the form of an adhesive that can be processed at a temperature lower than temperatures previously employed, and the substrate to which the adhesive is applied and the adhesive composition bond together at a lower temperature to make composite articles.

As used herein, the symbols M, D, T, and Q represent the functionality of the structural units of polyorganosiloxanes including organosilicon fluids, resins, and cured products thereof. These symbols are used in accordance with the established understanding in the silicone industry. M represents the monofunctional unit $R_3SiO_{1/2}$; D represents the difunctional unit $R_2SiO_{2/2}$; T represents the trifunctional unit $RSiO_{3/2}$; and Q represents the tetrafunctional unit $SiO_{4/2}$. Generally, R represents an organic group. The structural formula of these units is shown below.

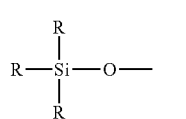

(M)

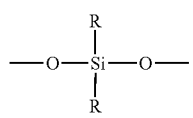

(D)

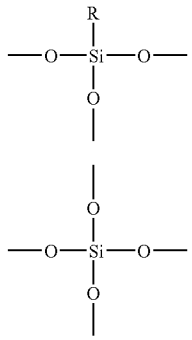

Organoborane amine complexes are known. For example, organoborane amine complexes used for the polymerization of acrylic monomers are described in U.S. Pat. No. 3,275,611 (Sep. 27, 1966). Organoboron compounds such as trialkylboranes by themselves are pyrophoric in the presence of oxygen, so preformed complexes between organoboron compounds and amine compounds are noted to have the benefit of imparting improved stability to organoboron compounds such as trialkylboranes.

Some recent developments in the structure of certain organoborane amine complexes are described in U.S. Pat. No. 6,706,831 (Mar. 16, 2004), including the use of the complexes in acrylate based adhesives. The combination of alkylborane amine complexes with amine reactive decomplexing agents to initiate polymerization of acrylic adhesives at room temperature is also disclosed.

U.S. Pat. No. 6,777,512 (Aug. 17, 2004), referred to hereafter as the '512 patent, describes certain polymerizable silicone compositions containing an organoborane amine complex, one or more compounds having unsaturation capable of free radical polymerization, combined with compounds having a siloxane backbone and reactive moieties capable of cure, and a catalyst for curing the siloxane. Such compositions offer the advantage of forming addition curable products with good adhesion to low energy substrates without inhibition problems associated with hydrosilylation curable compositions. The organoborane compound used to form the organoborane-amine complex is described as a trialkyl borane or an alkylcycloalkyl borane having the formula $BR'_3$ where R' is a $C_{1-10}$ alkyl group, a $C_{3-10}$ cycloalkyl group, or a structure in which two or more of the R' groups combine to form a cycloaliphatic ring. One limitation of such trialkylborane-based catalysts however is their tendency to bleed or bloom to the surface after curing has been completed because of limited compatibility with the matrix, particularly in the case of non-polar matrices such as silicones.

The '512 patent also discloses known amine compounds containing silane or organosiloxane compounds for forming complexes with trialkylborane compounds. The grafting of silicon-containing groups on amine complexing agents can lead to improvements in certain properties including improved compatibility with silicones before cure, depending on the nature of the silicon-containing group. However, when the amine compound is dissociated from the trialkylborane compound to initiate the curing reaction, the boron compound remains unmodified such that many of the aforementioned limitations of prior art compositions remain. The '512 patent does not disclose any organoborane-amine catalysts where any of the R' groups attached to boron contain a silicon atom.

Generally, curable organosilicon compositions and their uses are known including organopolysiloxane containing compositions. In such applications, it is desirable to use addition-curable materials since volatile byproducts are not generated during reactions in curing such materials. One example of a suitable addition-curable material is a silicone based elastomer that cross-links upon cure by hydrosilylation. Such materials can be used for a variety of applications such as molded rubber parts, release coatings, pressure-sensitive adhesives, cure-in-place adhesives, and coatings or encapsulants for the protection and passivation of electronic circuit boards.

However, the use of hydrosilylation chemistry for curing materials such as these is limited because hydrosilylation catalysts including platinum are susceptible to poisoning or inhibition by small quantities of compounds containing nitrogen, phosphorous, sulfur, tin, and arsenic, that strongly associate with such catalysts. This results in the formation of improperly formed or uncured products and limits the type and concentration of additives that can be used to modify the hydrosilylation curable composition. In addition, the presence of active hydrogen as an alcohol, acid, and even water can react with the organohydrogenpolysiloxane to create undesirable side reactions.

Therefore, additives and impurities containing hydrosilylation catalyst inhibiting groups that may be present during the curing process tend to reduce the cure rate or the physical properties of the hydrosilylation curable composition. In cases where the inhibiting groups are present on the surface of a substrate, development of adhesion between the substrate and the hydrosilylation curable composition may require substantially higher cure temperatures than usual. In severe cases, adhesion and cure may even be prevented altogether by the presence of inhibiting groups.

Curable organosilicon compositions using condensation curing catalysts are also known. For example, U.S. Pat. No. 6,534,581 (Mar. 18, 2003) describes certain compositions containing an organopolysiloxane with silicon bonded hydroxy groups, a crosslinking agent, an electrically conductive filler, and a condensation type catalyst. These compositions do not contain an easily poisoned hydrosilylation group catalyst, and so condensation curing organosilicon compositions offer the advantage of low temperature curing. However, condensation curing requires the diffusion of moisture and so condensation curable compositions can take a significantly longer time to cure in a confined geometry or in deep section. Thus the '581 patent points out that the compositions can be cured in about 10-20 hours at room temperature or in less than about 16 hours at 70° C. In applications such as the assembly and packaging of electronic products, an extended cure time introduces costly delays in the manufacturing process. Further, condensation curable compositions are capable of generating volatile by-products such as alcohols that lead to the formation of voids from out-gassing.

When the addition curable composition is free radical curable, the use of catalysts such as organic peroxides requires high temperatures to initiate the cure, or results in limited storage stability at ambient conditions. Further, free radical cures initiated by organic peroxides are easily inhibited in the presence of atmospheric oxygen leading to uncured or poorly cured products, or undesirable decomposition by-products are generated.

In addition, because high temperatures are needed to develop adhesion with the existing addition curable organosilicon compositions, the out-gassing of entrained volatile materials such as water from the substrate or from within the curable composition leads to the formation of undesirable voids or bubbles in joints formed between the silicone based elastomer and the substrate to which it is applied. This problem is particularly acute with hygroscopic polar polymeric substrates such as polyesters, polyamides, polyimides, and epoxy resins. To overcome the problem, the components used to make the compositions often require pre-drying that entails additional process steps and drying equipment in the manufacturing process. Also, the temperatures needed for curing the addition curable organosilicon compositions exceed the thermal stability limits of some polymeric substrates and/or the components mounted thereon. While other examples of external treatment methods for the surfaces of components exist such as application of a primer or exposure to high energy sources such as plasma, corona, or ultraviolet light, even these treatment methods require additional processing time, and/or costly equipment in the manufacturing process.

Due to the deficiencies associated with compositions of the prior art as noted above, there is a need for compositions that cure rapidly at lower temperatures and/or shorter times with improved surface properties, and that eliminate the need of pre-drying and external treatments of surfaces to which the compositions are applied. Also, due to deficiencies associated with organopolysiloxane based materials as noted above, there is a need for compositions that are able to cure rapidly at a lower temperature and/or shorter time with improved surface properties and resistance to common cure inhibitors, and that possess unique advantages in properties attributed by organosilicon based matrices in general.

The feature that distinguishes the present invention from the prior art is in the discovery of certain organosilicon functional boron amine catalyst complexes in which the organoborane compound used in the complex contains at least one silicon atom. Another feature is that the invention relates to curable compositions utilizing such organosilicon functional boron amine catalyst complexes offering unique control of properties such as working time, storage stability, cure rate, surface cure, and extractable content. This is due to the presence of silane or siloxane units as attachments to the boron compound. Another feature is that organosilicon-based materials cured by this technique offer unique physical properties with improved adhesion over conventional addition curable organosilicon compositions.

Accordingly, the invention is directed to organosilicon functional boron amine catalyst complexes that are useful for curing free-radical polymerizable monomers, oligomers, or polymers. The invention is also directed to curable compositions containing (i) the free radical polymerizable monomer, oligomer, or polymer and (ii) the organosilicon functional boron amine catalyst complex. The free radical polymerizable monomer, oligomer, or polymer can be (a) an organic compound or (b) an organosilicon monomer, oligomer, or polymer containing unsaturation and being capable of undergoing free radical polymerization.

The curable composition may also contain (iii) an amine reactive compound having amine reactive groups, such as a mineral acid, Lewis acid, carboxylic acid, carboxylic acid derivative, carboxylic acid metal salt, isocyanate, aldehyde, epoxide, acid chloride, or sulphonyl chloride. The functional groups of the amine reactive compound can be borne by organic molecules or organometallic compounds such as organosilanes, organopolysiloxanes, organotitanates, or organozirconates. The amine reactive compound can be monomeric, oligomeric, or polymeric. The amine reactive compound (iii) may contain free radical polymerizable groups such as acrylic acid or polyacrylic acid. In addition, the amine reactive compound (iii) can be attached to solid particles such as ground silica, precipitated silica, calcium carbonate, carbon black, carbon nanoparticles, silicon nanoparticles, barium sulfate, titanium dioxide, aluminum oxide, boron nitride, silver, gold, platinum, palladium, alloys thereof; or base metals such as nickel, aluminum, copper, and steel.

If porous or microporous foamed products are desired, the curable composition may also contain (iv) a component capable of generating a gas when mixed with compounds bearing active hydrogen and a catalyst. While the three ingredients are required for producing foamed products, one or more of them may already be present in some curable compositions. The ingredient capable of generating a gas can be a silicon hydride functional compound such as an organohydrogen polysiloxane; the compound bearing active hydrogen can be water, an alcohol, or a carboxylic acid; and catalyst can be platinum, a platinum group metal, tin, titanium, or zirconium.

The curable compositions are useful in preparing composite articles of manufacture in which substrates are coated or bonded together with the curable composition and cured. Such curable compositions and composite articles prepared therefrom can be used in a wide range of applications, such as in electronics, automotive, construction, sports and recreation, consumer products, and medical industries.

These and other features of the invention will become apparent from a consideration of the following detailed description of the invention.

The organosilicon functional boron amine catalyst complex containing at least one silicon atom is capable of initiating polymerization or crosslinking of free radical polymerizable monomers, oligomers, or polymers, by the introduction of an amine reactive compound having amine reactive groups, and/or by heating. Curable compositions herein utilizing the new complex contain (i) a free radical polymerizable monomer, oligomer, or polymer and (ii) the organosilicon functional boron amine catalyst complex. Optionally, an effective amount of (iii) an amine reactive compound having amine reactive groups can be included in the composition. Component (iii) should be capable of causing the organosilicon functional boron amine catalyst complex to dissociate. In compositions not containing component (iii), those compositions can be heated to temperatures sufficient to cause the organosilicon functional boron amine catalyst complex to dissociate.

These curable compositions offer rapid cure rates at low temperatures, particularly when component (iii) is included. When used as composite articles, the curable compositions are applied to at least one surface of a substrate. When used to manufacture composite articles, the process can be carried out by bonding the curable composition to a surface of the substrate at significantly lower temperatures, i.e., typically room temperature (RT) of 20-25° C./68-77° F., in shorter periods of time The Free Radical Polymerizable Monomer, Oligomer, or Polymer (i)

Component (i) can be an organic compound or an organometallic compound such as an organosilicon compound. In either case, it can be a single monomer, oligomer, or polymer containing unsaturation and capable of undergoing free radical polymerization. Mixtures of monomers, oligomers, and polymers can also be used. In many cases, it is preferred to use mixtures of monomer, oligomers, and polymers to impart the desired combination of bulk and surface properties such as cure rate, modulus, and adhesion. When component (i) is an organic compound, the selected compound will depend on the use of the cured product. Some suitable organic compounds are described in U.S. Pat. No. 6,762,260 (Jul. 13, 2004), including organic compounds such as 2-ethylhexylacrylate, 2-ethylhexylmethacrylate, methylacrylate, methylmethacrylate, neopentyl glycol diacrylate, neopentyl glycol dimethacrylate, glycidyl acrylate, glycidyl methacrylate, allyl acrylate, allyl methacrylate, stearyl acrylate, tetrahydrofurfuryl methacrylate, caprolactone acrylate, perfluorobutyl acrylate, perfluorobutyl methacrylate, 1H,1H,2H,2H-heptadecafluorodecyl acrylate, 1H,1H,2H,2H-heptadecafluorodecyl methacrylate, tetrahydroperfluoro acrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethylene glycol diacrylate, diethylene glycol dimethacrylate, dipropylene glycol diacrylate, dipropylene glycol dimethacrylate, polyethylene glycol diacrylate, polyethylene glycol dimethacrylate, polypropylene glycol diacrylate, polypropylene glycol dimethacrylate, trimethylolpropane triacrylate, trimethylolpropane trimethacrylate, ethoxylated trimethylolpropane triacrylate, ethoxylated trimethylolpropane trimethacrylate, pentaerythritol triacrylate, pentaerythritol trimethacrylate, pentaerythritol tetraacrylate, pentaerythritol tetramethacrylate, methyl-3-butenoate, allyl methyl carbonate, diallyl pyrocarbonate, allyl acetoacetate, diallyl carbonate, diallyl phthalate, dimethyl itaconate, diallyl carbonate, or combinations thereof. Other useful organic compounds include acrylate tipped polyurethane prepolymers prepared by reacting isocyanate reactive acrylate monomers, oligomers or polymers such as hydroxy acrylates with isocyanate functional prepolymers. Also useful are a class of conductive monomers, dopants, oligomers, polymers, and macromonomers having an average of at least one free radical polymerizable group per molecule, and the ability to transport electrons, ions, holes, and/or phonons. For example, reference may be had to U.S. Pat. No. 5,929,194 (Jul. 27, 1999) that describes the preparation of various free radical polymerizable hole transporting compounds such as 4,4'4"-tris[N-(3 (2-acryloyloxyethyloxy)phenyl)-N-phenylamino]triphenylamine, 4,4'4"-tris[N-(3(benzoyloxyphenyl)-N-phenylamino]triphenylamine, and preparation of electroluminescent devices made there from. The acrylic functional groups prefixes acryloyl- and acryl- are used interchangeably throughout this document, as are methacryloyl- and methacryl-.

When an organosilicon compound is used as component (i), again the selected compound depends on the use of the cured product. Generally, it comprises organosilanes or organopolysiloxanes having on average at least one free radical polymerizable moiety. The organosilicon compound can be monomeric, oligomeric, polymeric, or it can be a mixture of monomers, and/or oligomers, and/or polymers. Higher molecular weight species of such free radical polymerizable compounds are often referred to in the art as macromonomers. The organosilicon compounds can contain mono-functional or multi-functional units in the free radical polymerizable group. This allows for its polymerization to linear polymers, branched polymers of various architecture, copolymers of various architecture, or crosslinked polymeric networks. The monomers and oligomers can be any monomer or oligomer normally used to prepare addition or condensation curable polymers, or they can be monomers or oligomers used in other types of curing reactions, provided they contain at least one free radical polymerizable group.

Suitable organosilicon monomers include compounds having a structure generally corresponding to the formula $R''_n Si(OR''')_{4-n}$, where n is 0-4; and where at least one of the R" or R'" groups contains a free radical polymerizable group. The R" and R'" groups can be independently, hydrogen; a halogen atom; or an organic group including alkyl groups, haloalkyl groups, aryl groups, haloaryl groups, alkenyl groups, alkynyl groups, acrylate functional groups, and methacrylate functional groups. The R" and R'" groups may also contain other organic functional groups including glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups.

Representative examples of free radical polymerizable organosilicon monomers include compounds such as methacryloxymethyltrimethoxysilane, 3-methacryloxypropyltrimethoxysilane, methacryloxymethyltriethoxysilane, 3-methacryloxypropyltriethoxysilane, acryloxymethyltrimethoxysilane, 3-acryloxypropyltrimethoxysilane, methacryloxymethyltrimethylsilane, 3-methacryloxypropyltrimethylsilane, acryloxymethyltriethoxysilane, 3-acryloxypropyltriethoxysilane, acryloxymethyltrimethylsilane, 3-acryloxylpropyltrimethylsilane, vinyltrimethoxysilane, allyltrimethoxysilane, 1-hexenyltrimethoxysilane, tetra (allyloxysilane), tetra(3-butenyl-1-oxy)silane, tri(3-butenyl-1-oxy)methylsilane, di(3-butenyl-1-oxy)dimethylsilane, and 3-butenyl-1-oxy trimethylsilane. The preferred free radical polymerizable moieties for these organosilicon compounds are aliphatic unsaturated groups in which the double bond is located at the terminal positions, internal positions, or both positions relative to the functional group. The most preferred free radical polymerizable moiety for the organosilicon compounds are acrylate groups or methacrylate groups.

When the free radical polymerizable organosilicon component is a monomer, oligomer, or polymer, the compound can be an organopolysiloxane having a linear, branched, hyperbranched, or resinous structure. The compound can be homopolymeric or copolymeric. The free radical polymerizable moiety for the organopolysiloxane can be an unsaturated organic group such as an alkenyl group having 2-12 carbon atoms, exemplified by the vinyl group, allyl group, butenyl group, or the hexenyl group. The unsaturated organic group can also comprise alkynyl groups having 2-12 carbon atoms, exemplified by the ethynyl group, propynyl group, or the butynyl group. The unsaturated organic group can bear the free radical polymerizable group on an oligomeric or polymeric polyether moiety such as an allyloxypoly(oxyalkylene) group or a halogen substituted analog thereof. The free radical polymerizable organic group can contain acrylate functional groups or methacrylate functional groups, exemplified by acryloxyalkyl groups such as 3-acryloxypropyl, 2-acryloxyethyl, and acryloxymethyl, groups, and methacryloxyalkyl groups such as 3-methacryloxypropyl, 2-acryloxyethyl, and acryloxymethyl groups. The unsaturated organic groups can be located at the terminal positions, pendant positions, or both the terminal and pendant positions relative to the polymer backbone. The preferred free radical polymerizable moiety for monomeric, oligomeric, and polymeric organosilicon compounds are acrylate groups and methacrylate groups.

Any remaining silicon bonded organic groups can be monovalent organic groups free of aliphatic unsaturation. The monovalent organic group can have 1-20 carbon atoms, preferably 1-10 carbon atoms, and is exemplified by alkyl groups such as methyl, ethyl, propyl, pentyl, octyl, undecyl, and octadecyl; cycloalkyl groups such as cyclohexyl; aryl groups such as phenyl, tolyl, xylyl, benzyl, and 2-phenylethyl; alkyloxypoly(oxylalkylene) groups such as propyloxypoly(oxyethylene), propyloxypoly(oxypropylene), propyloxy-poly(oxypropylene)-co-poly(oxyethylene) groups, halogen substituted analogs thereof; cyanofunctional groups including cyanoalkyl groups such as cyanoethyl and cyanopropyl; carbazole groups such as 3-(N-carbazolyl)propyl; arylaminofunctional groups such as 4-(N,N-diphenylamino)phenyl-3-propyl; and halogenated hydrocarbon groups such as 3,3,3-trifluoropropyl, 3-chloropropyl, dichlorophenyl, and 6,6,6,5, 5,4,4,3,3-nonafluorohexyl.

The free radical polymerizable organosilicon compound can vary in consistency from a fluid having a viscosity of 0.001 Pa·s at 25° C. to a gum. The free radical polymerizable organosilicon compound can also be a solid that becomes flowable at an elevated temperature or by the application of shear.

Component (i) includes organopolysiloxane fluids having the formulae:
(a) $R^1_3SiO(R^1_2SiO)_a(R^1R^2SiO)_bSiR^1_3$,
(b) $R^3_2R^4SiO(R^3_2SiO)_c(R^3R^4SiO)_dSiR^3_2R^4$, or
(c) combinations of such fluids.

In Formula (a), a has an average value of zero to 20,000, b has an average value of 1-20,000, c has an average value of zero to 20,000, and d has an average value of zero to 20,000. Each $R^1$ group is independently a monovalent organic group. The $R^2$ group is independently an unsaturated monovalent organic group. The $R^3$ groups can be the same as the $R^1$ groups. Each $R^4$ is independently an unsaturated organic group.

Suitable $R^1$ groups are monovalent organic groups including acrylic functional groups such as acryloxymethyl, 3-acryloxypropyl, methacryloxymethyl and 3-methacryloxypropyl, groups; alkyl groups such as methyl, ethyl, propyl, and butyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5, 4,4,3,3-nonafluorohexyl groups; alkenyloxypoly(oxyalkyene) groups such as allyloxy(polyoxyethylene), allyloxypoly (oxypropylene), and allyloxy-poly(oxypropylene)-co-poly (oxyethylene) groups; alkyloxypoly(oxyalkyene) groups such as propyloxy(polyoxyethylene), propyloxypoly(oxypropylene), and propyloxy-poly(oxypropylene)-co-poly (oxyethylene) groups; halogen substituted alkyloxypoly (oxyalkyene) groups such as perfluoropropyloxy (polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as aminomethyl, 2-aminoethyl, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as glycidoxymethyl, 3-glycidoxypropyl, 2-(3,4,-epoxycyclohexyl) ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as isocyanatomethyl, 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carbazole groups such as 3-(N-carbazolyl)propyl; arylamino-functional groups such as 4-(N,N-diphenylamino)phenyl-3-propyl; carboxylic acid functional groups such as 3-carboxypropyl and 2-carboxyethyl groups; and metal salts of carboxylic acids such as the zinc, sodium, or potassium salts of 3-carboxypropyl and 2-carboxyethyl.

The $R^2$ group is exemplified by alkenyl groups such as vinyl, allyl, and butenyl groups; alkynyl groups such as ethynyl and propynyl groups; and acrylic functional groups such as acryloxymethyl, 3-acryloxypropyl, methacryloxymethyl and methacryloxypropyl groups. As noted, the $R^3$ groups can be the same as the $R^1$ groups. The $R^4$ group is exemplified by alkenyl groups such as vinyl, allyl, and butenyl groups; alkynyl groups such as ethynyl and propynyl groups; alkenyloxy-poly(oxyalkyene) groups such as allyloxy(polyoxyethylene), allyloxypoly(oxypropylene), and allyloxy-poly(oxypropylene)-co-poly(oxyethylene) groups; and acrylic functional groups such as acryloxymethyl, 3-acryloxypropyl, methacryloxymethyl and 3-methacryloxypropyl groups.

Some representative organopolysiloxane fluids suitable for use as component (i) include α,ω-methacryloxymethyl-dimethylsilyl terminated polydimethylsiloxanes, α,ω-methacryloxypropyl-dimethylsilyl terminated polydimethylsiloxanes; α,ω-acryloxymethyl-dimethylsilyl terminated polydimethylsiloxanes, α,ω-acryloxypropyl-dimethylsilyl terminated polydimethylsiloxanes; pendant acrylate functional polymers and methacrylate functional polymers such as poly(acryloxymethyl-methylsiloxy)-polydimethylsiloxane copolymers, poly(acryloxypropyl-methylsiloxy)-polydimethylsiloxane copolymers, poly(methacryloxymethyl-methylsiloxy)-polydimethylsiloxane copolymers, and poly(methacryloxypropyl-methylsiloxy)-polydimethylsiloxane copolymers; and telechelic polydimethylsiloxanes having multiple acrylate functional groups or methacrylate functional groups such as compositions formed via Michael addition of multi-acrylate monomers or multi-methacrylate monomers to amine terminated polydimethylsiloxanes. Such functionalizing reactions can be carried out a priori or in-situ.

It may be desirable to use a mixture of organopolysiloxane fluids differing in their degree of functionality and/or the nature of the free radical polymerizable group. For example, a much faster cure rate and a reduced sol content can be obtained by using a tetra-functional telechelic polydimethylsiloxane prepared by the Michael addition reaction of N-(methyl)isobutyl-dimethylsilyl terminated polydimethylsiloxane with two molar equivalents of trimethylolpropane tri-acrylate as component (i) of the composition, relative to di-functional methacryloxypropyl-dimethylsilyl terminated polydimethylsiloxanes having a similar degree of polymerization (DP). However, the latter compositions allow better working time and produce a lower modulus elastomer. Hence, combinations combinations of component (i) having differing structures may be beneficial. Methods for preparing such organopolysiloxane fluids are known and include the hydrolysis and condensation of the corresponding organohalosilanes or the equilibration of cyclic polydiorganosiloxanes.

Component (i) can be an organosiloxane resin including MQ resins containing $R^5{}_3SiO_{1/2}$ units and $SiO_{4/2}$ units; TD resins containing $R^5SiO_{3/2}$ units and $R^5{}_2SiO_{2/2}$ units; MT resins containing $R^5{}_3SiO_{1/2}$ units and $R^5SiO_{3/2}$ units; MTD resins containing $R^5{}_3SiO_{1/2}$ units, $R^5SiO_{3/2}$ units, and $R^5{}_2SiO_{2/2}$ units; or combinations thereof. Each $R^5$ group in these organosiloxane resins represents a monovalent organic group. The monovalent organic group $R^5$ can have 1-20 carbon atoms, preferably 1-10 carbon atoms.

Some examples of suitable monovalent organic groups representative of the $R^5$ group include acrylate functional groups such as acryloxyalkyl groups; methacrylate functional groups such as methacryloxyalkyl groups; cyanofunctional groups; and monovalent hydrocarbon groups. Monovalent hydrocarbon groups include alkyl groups such as methyl, ethyl, propyl, pentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butynyl groups; aryl groups such as phenyl, tolyl, xylyl, benzyl, and 2-phenylethyl groups; halogenated hydrocarbon groups such as 3,3,3-trifluoropropyl, 3-chloropropyl, dichlorophenyl, and 6,6,6,5,5,4,4,3,3-nonafluorohexyl groups; and cyano-functional groups including cyanoalkyl groups such as cyanoethyl and cyanopropyl groups.

The $R^5$ group can also comprise an alkyloxypoly(oxyalkyene) group such as propyloxy(polyoxyethylene), propyloxypoly(oxypropylene) and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene) and perfluoropropyloxy-poly(oxypropylene)-co-poly(oxyethylene) groups; alkenyloxypoly(oxyalkyene) groups such as allyloxypoly(oxyethylene), allyloxypoly(oxypropylene) and allyloxy-poly(oxypropylene)-co-poly(oxyethylene) groups; alkoxy groups such as methoxy, ethoxy, n-propoxy, isopropoxy, n-butoxy and ethylhexyloxy groups; aminoalkyl groups such as aminomethyl, 2-aminoethyl, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; hindered aminoalkyl groups such as tetramethylpiperidinyl oxypropyl groups; epoxyalkyl groups such as 3-glycidoxypropyl, 2-(3,4,-epoxycyclohexyl)ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as isocyanatomethyl, 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carbazole groups such as 3-(N-carbazolyl)propyl; arylamino-functional groups such as 4-(N,N-diphenylamino) phenyl-3-propyl; carboxylic acid functional groups such as 3-carboxypropyl, 2-carboxyethyl, and 10-carboxydecyl groups; and metal salts of carboxylic acids such as zinc, sodium, and potassium salts of 3-carboxypropyl and 2-carboxyethyl.

The organosiloxane resin can contain an average of 1-40 mole percent of free radical polymerizable groups such as unsaturated organic groups. The unsaturated organic groups may be an alkenyl group, alkynyl group, acrylate-functional group, methacrylate-functional group, or a combination of such groups. The mole percent of unsaturated organic groups in the organosiloxane resin is considered herein to be the ratio of (i) the number of moles of unsaturated groups containing siloxane units in the resin, to (ii) the total number of moles of siloxane units in the resin, times a factor of 100. Some specific examples of suitable organosiloxane resins that are useful as component (i) are $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, $TT^{Phenyl}T^{Methacryloxymethyl}$ resins, and $TT^{Phenyl}T^{Methacryloxypropyl}$ resins, where M, D, T, and Q have the same meanings as defined above.

Methods of preparing such organosiloxane resins are known including resins made by treating a resin copolymer produced by a silica hydrosol capping process, with an alkenyl containing endblocking reagent, as described in U.S. Pat.

No. 2,676,182 (Apr. 20, 1954). This method involves reacting a silica hydrosol under acidic conditions with a hydrolyzable triorganosilane such as trimethylchlorosilane, a siloxane such as hexamethyldisiloxane, or a mixture thereof, followed by recovery of a copolymer having M and Q units. The copolymer typically contains about 2-5 percent by weight of hydroxyl groups. Organosiloxane resins containing less than 2 percent by weight of silicon bonded hydroxyl groups may then be prepared by reacting the copolymer with an endblocking agent containing unsaturated organic groups, and with an endblocking agent free of aliphatic unsaturation, in an amount sufficient to provide 3-30 mole percent of unsaturated organic groups in the product. Some suitable endblocking agents include silazanes, siloxanes, and silanes; and preferred endblocking agents are described in U.S. Pat. No. 4,584,355 (Apr. 22, 1986), U.S. Pat. No. 4,585,836 (Apr. 29, 1986), and U.S. Pat. No. 4,591,622 (May 22, 1986). A single endblocking agent or a mixture of endblocking agents may be used to prepare such organosiloxane resins.

Another type of organosilicon compound that can be used as component (i) is a composition formed by copolymerizing an organic compound having a polymeric backbone, with an organopolysiloxane, where an average of at least one free radical polymerizable group is incorporated per molecule. Some suitable organic compounds include hydrocarbon based polymers such as polyisobutylene, polybutadienes, and polyisoprenes; polyolefins such as polyethylene, polypropylene and polyethylene polypropylene copolymers; polystyrenes; styrene butadiene; and acrylonitrile butadiene styrene; polyacrylates; polyethers such as polyethylene oxide or polypropylene oxide; polyesters such as polyethylene terephthalate or polybutylene terephthalate; polyamides; polycarbonates; polyimides; polyureas; polymethacrylates; and partially fluorinated or perfluorinated polymers such as polytetrafluoroethylene; fluorinated rubbers; terminally unsaturated hydrocarbons, olefins and polyolefins. The organic compound can be a copolymer of any of these compounds, including polymers containing multiple organic functionality, multiple organopolysiloxane functionality, or combinations of organopolysiloxanes and organic compounds. The copolymeric structures can vary in the arrangement of repeating units from random, grafted, to being blocky in nature.

Component (i), in addition to bearing on average at least one free radical polymerizable group, may have a physical transition temperature, bear an organofunctional group with a physical transition temperature, or upon curing form matrices that have a physical transition temperature, i.e., glass transition or melting transition, such that the composition undergoes changes marked by a softening or non-linear reduction in its viscosity on reaching certain temperatures under the conditions of use. Such organopolysiloxane matrices are useful for phase change compositions such as those found to be useful in thermal interface materials for electronic components. The organopolysiloxane matrix may be an organofunctional silicone wax. The wax can be an uncrosslinked organofunctional silicone wax, a crosslinked organofunctional silicone wax, or a combinations of waxes. Silicone waxes such as these are commercially available and are described in U.S. Pat. No. 6,620,515 (Sep. 16, 2003). When the organofunctional silicone wax bears at least one free radical polymerizable group such as an acrylate or methacrylate group, it is useful to impart phase changes when used as component (i). Component (i) can also comprise a mixture of any of the organic compounds, organosilicon compounds, and/or organopolysiloxane compounds described above.

The Organosilicon Functional Boron Amine Catalyst Complex (ii)

The organosilicon functional boron amine catalyst complex (ii) is a complex formed between an organoborane compound containing at least one silicon atom, and a suitable amine compound that renders the complex stable under conditions of use, preferably under ambient conditions. Organosilicon is defined herein as meaning any silicon atom containing group, siloxane oligomer containing group, or siloxane polymer containing group. The complex has the formula:

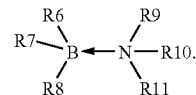

In the formula, B represents boron; R6, R7, and R8 are groups that can be independently selected from hydrogen; a cycloalkyl group; a linear or branched alkyl group having 1-12 carbon atoms on the backbone; an alkylaryl group; an organosilane group such as an alkylsilane or an arylsilane group; an organosiloxane group; an alkylene group capable of functioning as a covalent bridge to another boron atom; a divalent organosiloxane group capable of functioning as a covalent bridge to another boron atom; or halogen substituted homologues thereof. At least one of the R6, R7, or R8 groups contains one or more silicon atoms, and the silicon-containing group is directly, i.e., covalently, attached to boron. R9, R10, and R11 are a group that yields an amine compound or a polyamine compound capable of complexing boron, such as hydrogen, an alkyl group containing 1-10 carbon atoms, a halogen substituted alkyl group containing 1-10 carbon atoms, or an organosilicon functional group. Two or more of the R6, R7, or R8 groups, and two or more of the R9, R10, or R11 groups, can combine to form heterocyclic structures, provided the sum of the number of atoms from the two combining groups does not exceed 11. Preferably, the silicon containing group is such that the boron atom is separated from the nearest silicon atom by at least one covalent bond, and more preferably by at least two covalent bonds.

In particular, the organosilicon functional boron portion of the complex contains a silane or a siloxane functionality. It can comprise any group containing both silicon and boron atoms. The boron and silicon atoms can be linked by any carbon, nitrogen, sulfur, or oxygen containing group. More particularly, the organosilicon functional boron portion of the complex is the portion R6R7R8B of the complex where B represents boron; and R6, R7, and R8 are the groups as defined above.

Some examples of groups suitable as R6, R7, and R8 groups include $R^{iv}{}_3SiCH_2CH_2CH_2—$, $(R^{iv}O)_3SiCH_2CH_2CH_2—$, $R^{iv}{}_3SiCH_2CH_2—$, $(R^{iv}O)_3SiCH_2CH_2—$, $(R^{iv}O)_3SiCH_2CH_2CH_2CH_2CH_2CH_2—$, $(R^{iv}O)_3SiCH_2CH_2CH_2OC(O)CH_2CH_2—$, $(R^{iv}O)_3SiCH_2CH_2CH_2OC(O)CH(CH_3)—$, $(R^{iv}O)_3SiCH_2CH_2CH_2OC(O)CH(CH_3)CH_2—$, $(R^{iv}O)_3SiCH_2CH_2CH_2OC(O)CH(CH_3)_2—$, and $CH_2=CH—(CH_2)_x—(Si(R^{iv})_2—O)_ySi(R^{iv})_2—(CH_2)_x—CH_2—CH_2—$. In these groups, x is zero to 20 and y is 1-1,000. When two or more of the R6, R7, or R8 groups combine to form heterocyclic structures with the boron atom, some representative examples of suitable groups that can be used include $—CH_2CH_2CH_2Si(R^{iv})_2CH_2CH_2CH_2—$; $—CH_2CH_2Si(R^{iv})_2CH_2CH_2—$; and $—CH_2CH_2Si(R^{iv})_2OSi(R^{iv})_2CH_2CH_2—$.

Some examples of monovalent groups suitable as the $R^{iv}$ group include hydrogen; halogen; alkyl groups such as methyl, ethyl, propyl, and butyl groups; alkenyl groups such as vinyl, allyl, and butenyl groups; acrylic functional groups such as acryloxymethyl, 3-acryloxypropyl, methacryloxymethyl, and 3-methacryloyloxypropyl groups; alkynyl groups such as ethynyl and propynyl groups; aromatic groups such as phenyl, tolyl, and xylyl groups; cyanoalkyl groups such as cyanomethyl, cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; epoxyalkyl groups such as glycidoxymethyl, 3-glycidoxypropyl, 2-(3,4,-epoxycyclohexyl)ethyl, and 5,6-epoxyhexyl groups; ester functional groups such as acetoxymethyl and benzoyloxypropyl groups; and hydroxyl functional groups such as hydroxy and 2-hydroxyethyl groups.

Some representative examples of suitable organosilicon functional boron compounds that can be used to form the complex include the following compounds having various combinations of R6, R7, and R8 groups. In these formulae, y has the same value as defined above.

Organosilicon Functional Boron Compound 1

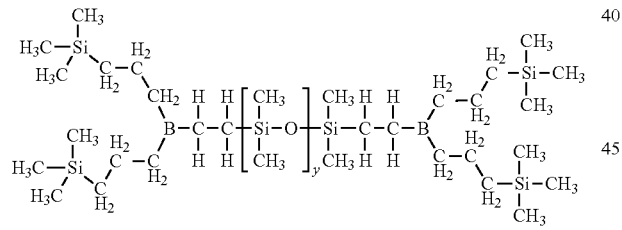

Organosilicon Functional Boron Compound 2

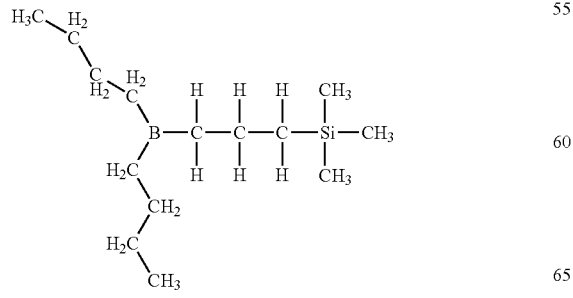

Organosilicon Functional Boron Compound 3

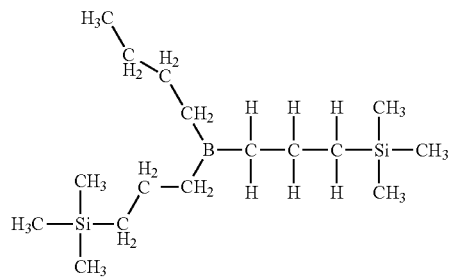

Organosilicon Functional Boron Compound 3A

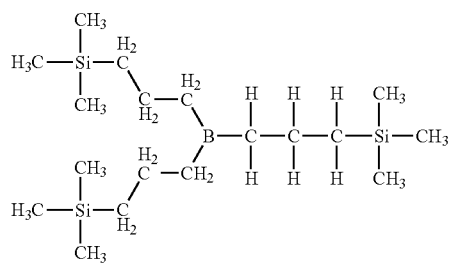

Organosilicon Functional Boron Compound 4

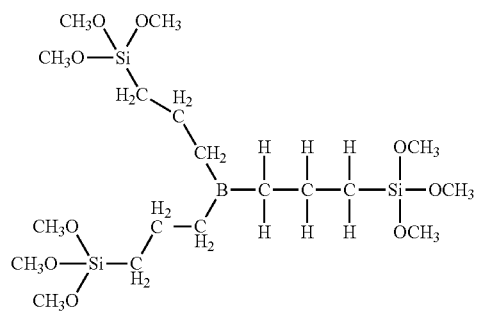

Organosilicon Functional Boron Compound 5

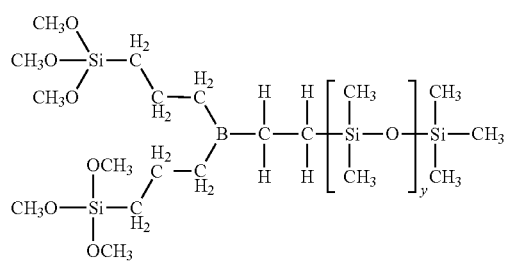

Organosilicon Functional Boron Compound 6

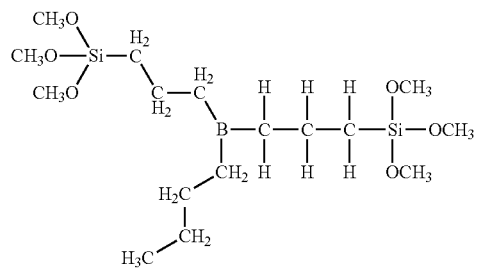

-continued

Organosilicon Functional Boron Compound 7

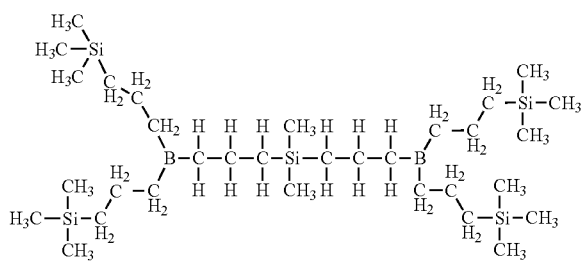

Organosilicon Functional Boron Compound 8

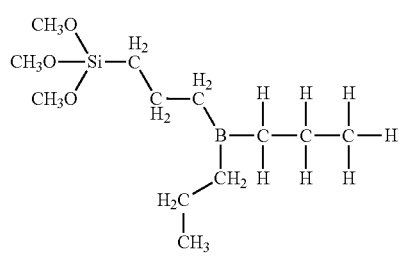

When two or more of the R6, R7, or R8 groups combine to form heterocyclic structures with the boron atom, some representative examples of suitable organosilicon functional boron compounds that can be used to form the complex include the following three compounds, in which y has the same value as defined above:

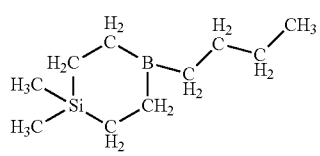

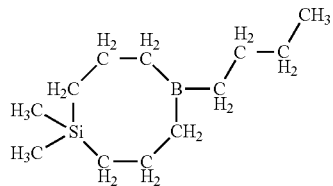

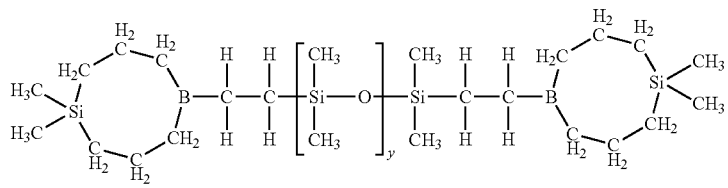

The heterocyclic structures can be synthesized by techniques such as illustrated in the following reaction scheme as exemplified by the following scheme where 9-BBN represents 9-borabicyclo[3,3,1]nonane. As illustrated, the bicyclic ring is depicted as commonly shown in chemical literature relating to boron compounds, and reference may be had to *The Journal of Organic Chemistry*, 1980, Volume 45, Pages 3571-3578, in the paper entitled *Convenient and Regiospecific Route to Functionalized Organosilanes through Hydroboration of Alkenylsilanes*, by John A. Soderquist and Herbert C. Brown.

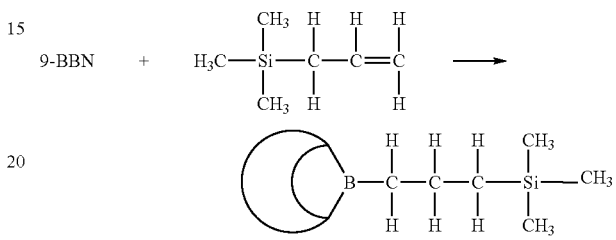

Another example of a genus of organosilicon functional boron compounds that can be used to complex with an amine reactive compound to form the complex is shown below. In this genus, the organosilicon functional boron compound is directly bonded to an organopolysiloxane through a bridge of at least two covalent bonds. In the organopolysiloxane backbone, the boron atom may be attached to silicon at terminal or pendant locations:

Organosilicon Functional Boron Compound 9

Organosilicon Functional Boron Compound 10

Organosilicon Functional Boron Compound 11

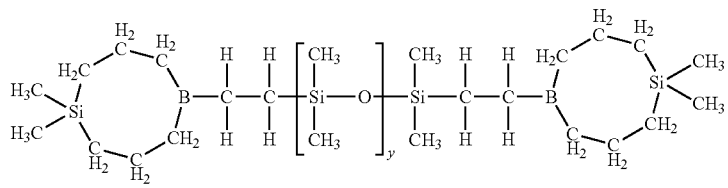

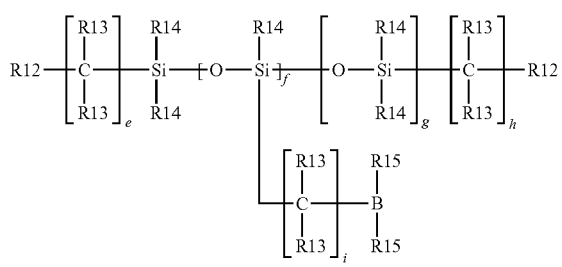

As illustrated, R12 is hydrogen, a halogen, an alkyl group, an alkoxy group, a cycloalkyl group, an aryl group, a halogen substituted alkyl group or a halogen substituted cycloalkyl group, or the group —B(R15)$_2$. When R12 is —B(R15)$_2$, then e and h should have a value of at least one and not more than twelve. R13 is hydrogen, a halogen, a branched or linear alkyl group, or a halogen-substituted linear or halogen-substituted branched alkyl group. R14 represents the same type of groups as previously defined for R$^{iv}$. The R15 groups represent the same type of groups as previously defined for the R6, R7, and R8 groups. The values of e, f, and h are each zero to 20; the value of g is 1-20,000; and the value of i is 1-12.

The article by Soderquist and Brown noted above, and the references cited therein, provide numerous examples and detailed synthetic routes for making the organosilicon functional borane part of the boron amine catalyst complex through hydroboration reactions. For example, one facile general route involves the reaction of a borane-tetrahydrofuran complex with a terminally unsaturated organosilicon compound. It is known in the art that such reactions generally can produce a mixture of products derived from the addition of the boron to either the α penultimate position or the β terminal position of the carbon of the double bond. It is noted that the specific examples of structures illustrated herein show only β hydroboration products for the sake of simplicity. However, it should be understood that the α product, or a mixture of β and α products, may also be used as the organosilicon-functional borane part of the boron amine catalyst complex. Preferably, the organosilicon functional borane compound is such that at least 20 mol percent, more preferably at least 50 mol percent, of the organosilicon-functional groups attached directly to boron, are derived from the β terminal adduct.

The amine portion of the complex may be provided by a variety of amines having at least one amine group including polyamines, cyclic amines, and blends of different amine groups. The amine may be a primary or secondary amine. Some suitable compounds are disclosed in U.S. Pat. No. 5,106,928 (Apr. 21, 1992); U.S. Pat. No. 5,539,070 (Jul. 23, 1992); U.S. Pat. No. 5,686,544 (Nov. 11, 1997); U.S. Pat. No. 6,806,330 (Oct. 19, 2004); and the '512 patent. Examples of amine compounds useful to form the amine portion of the complex include ethylamine, n-butylamine, 1,3 propane diamine, 1,6-hexanediamine, methoxypropylamine, pyridine, and isophorone diamine. Other specific examples of amine compounds are described in such patents.

Silicon containing amine compounds can also be used to form the complex such as aminomethyltrimethoxysilane, 3-aminopropyltrimethoxysilane, aminomethyltriethoxysilane, 3-aminopropyltriethoxysilane, 2-(trimethoxysilylethyl)-pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxyethoxy)silane, N-(2-aminoethyl)aminomethyltrimethoxysilane, N-(2-aminoethyl)-3-aminopropyltrimethoxysilane, N-(6-aminohexyl)aminomethyltrimethoxysilane, N-(6-aminohexyl)aminomethyltrimethoxysilane, N-(2-aminoethyl)-11-aminoundecyltrimethoxysilane, (aminoethylaminomethyl)phenethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine.

Amine functional organopolysiloxanes are also useful for forming the complex including compounds described above in formulas (a) and (b), and compounds previously described for the organopolysiloxane resins. The amine functional organopolysiloxane must contain at least one amine functional group, representative of which are aminomethyl, 2-aminoethyl, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole. Specific examples include terminal and/or pendant amine-functional polydimethylsiloxane oligomers and polymers, terminal and/or pendant amine-functional random, graft and block copolymers and co-oligomers of polydimethylsiloxane and poly(3,3,3 trifluoropropyl-methylsiloxane), terminal and/or pendant amine-functional random, graft and block copolymers and co-oligomers of polydimethylsiloxane and poly(6,6,6,5,5,4,4,3,3-nonfluorohexyl-methylsiloxane), and terminal and/or pendant amine-functional random, graft and block copolymers and co-oligomers of polydimethylsiloxane and polyphenymethylsiloxane. Other examples of useful compounds include resinous amine-functional siloxanes such as the amine-functional compounds described previously as organopolysiloxane resins.

Also useful in forming the complex are other nitrogen containing compounds including N-(3-triethyoxysilylpropyl)-4,5-dihydroimidazole, ureidopropyltriethoxysilane, siloxanes of formulas similar to formulas (a) and (b) noted above, and those compounds described previously as organopolysiloxane resins in which at least one group is an imidazole, amidine, or ureido functional group. When the amine compound is polymeric, the molecular weight is not limited except that it should be sufficient to maintain a high concentration of boron in order to permit curing or polymerization of the composition. For example, in two-part compositions, the part containing the organoborane initiator may be diluted with other components of the composition, or it may comprise the initiator complex alone.

If desired, the curable composition may be stabilized by physically or chemically attaching the organoborane amine complex to solid particles. This provides a way to control working times, as well as to stabilize liquid phase organoborane amine complexes against separating from the rest of the composition during storage. For example, chemical attachment can be performed by pretreating solid particles such as ground silica, precipitated silica, calcium carbonate, or barium sulfate, with a condensation reactive compound containing an amine group such as aminopropyltrimethoxysilane. The pretreatment is followed by complexation with an organoborane compound, or by the direct treatment of the solid particles using a preformed organoborane amine complex that is condensation reactive. When the solid particles contain surface functional groups, additives such as surface treating agents or impurities that are inherently amine reactive, require appropriate pre-cautions to avoid premature decomplexation of the organoborane amine complex being attached. Solid particles containing amine reactive substances can be purified or neutralized before attachment of the organoborane amine complex. Alternatively, the attachment of the organoborane amine complex can be performed in an oxygen free environment.

The Amine Reactive Compound having Amine Reactive Groups (iii)

The curable composition may contain an amine reactive compound (iii) that is capable of initiating the polymerization or crosslinking when mixed with the organosilicon functional boron amine catalyst complex (ii) and exposed to an oxygenated environment. The amine reactive compound may be a liquid, gas, or solid. The amine reactive compound may be a small molecule, a monomer, an oligomer, a polymer, or a mixture thereof, and may also be diluted or borne by a carrier such as an aqueous or non-aqueous solvent, or by a filler particle. The amine reactive compound may contain free radical polymerizable groups or other functional groups such as a hydrolyzable group. The amine reactive groups on the amine reactive compound may be borne on an organic, organosilicon, or organopolysiloxane compound. The presence of component (iii) allows initiation of polymerization or crosslinking to occur at temperatures below the dissociation temperature of the organosilicon functional boron amine catalyst complex (ii), including room temperature and below. To achieve storage stability of the curable composition in the presence of oxygen, it is preferred that components (ii) and (iii) be physically or chemically isolated. Thus, curable compositions containing components (i), (ii), and (iii) can be rendered air stable by packaging component (iii) separately from component (ii) in multi-component formulations. Alternatively, components (ii) or (iii), or both components (ii) and (iii), can be encapsulated, or delivered in separate phases. This may be accomplished by introducing one or both of components (ii) and (iii) in a solid form or forms that prevents intimate mixing of components (ii) and (iii). Curing of the curable composition can be activated by heating it above the softening temperature of the solid phase component or encapsulant, or by introducing a solubilizing agent that allows mixing of components (ii) and (iii). Components (ii) and (iii) can also be combined in a single container without the occurrence of significant polymerization or crosslinking, by packaging the components (ii) and (iii) in a container where the mixing conditions are anaerobic.

Some examples of amine reactive compounds having amine reactive groups capable of rapidly initiating polymerization or curing in the presence of oxygen include mineral acids; Lewis acids; carboxylic acids; carboxylic acid derivatives such as anhydrides and succinates; carboxylic acid metal salts; isocyanates; aldehydes; epoxides; acid chlorides; and sulphonyl chlorides. Suitable amine reactive compounds include acrylic acid, methacrylic acid, polyacrylic acid, polymethacrylic acid, methacrylic anhydride, polymethacrylic anhydride, undecylenic acid, oleic acid, lauric acid, lauric anhydride, citraconic anhydride, ascorbic acid (Vitamin C), methylene bis-(4-cyclohexylisocyanate) monomers or oligomers, hexamethylene diisocyanate monomers or oligomers, toluene-2,4-diisocyanate monomers or oligomers, methylene diphenyl isocyanate monomers or oligomers, isophorone diisocyanate monomers or oligomers, (methacryloyl)isocyanate, 2-(methacryloyloxy)ethyl acetoacetate, undecylenic aldehyde, and dodecyl succinic anhydride.

In order to improve the compatibility of the amine reactive compound in curable compositions containing organosiloxane matrices, it may be advantageous when the amine reactive compound comprise an organosilane, or an organopolysiloxane having amine reactive groups. Some examples include 3-isocyanatopropyltrimethoxysilane; 3-glycidoxypropyltrimethoxysilane; propylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes. The '512 patent describes other silicon containing compounds that can be used, including compounds that release an acid when exposed to moisture. In addition, the '512 patent discloses other types of amine reactive decomplexation agents that can be used.

Other compounds that can be used include compounds capable of generating amine reactive groups when exposed to ultraviolet radiation such as a photoacid generator. Examples of such compounds include iodonium salts containing $[SbF_6]^-$ counterions. In such an embodiment, it may be useful to optionally include a photosensitizing compound such as isopropylthioxanthone.

The curable composition can be stabilized by attaching the amine reactive compound to solid particles. This procedure enables one to control the working time, and it stabilizes the liquid phase containing the amine reactive compound against separation from the rest of the curable composition during storage. Attachment of the amine reactive compound to the solid particles can be accomplished by known surface treatment techniques that can be carried out in-situ or a priori. Some surface treatment methods include using a condensation reactive compound to pre-treat solid particles such as ground or precipitated silica, calcium carbonate, carbon black, carbon nanoparticles, silicon nanoparticles, barium sulfate, titanium dioxide, aluminum oxide, zinc oxide, boron nitride, silver, gold, platinum, palladium, and alloys thereof; or to pre-treat base metals such as nickel, aluminum, copper, and steel. The pretreatment is followed by reaction of the pre-treated solid particles with a compound having amine reactive groups, or by the direct treatment of the pre-treated solid particles with an amine reactive compound having hydrolyzable moieties. Some examples of condensation reactive compounds include isocyanatomethyltriethoxysilane, 3-isocyanatopropyltriethoxysilane, isocyanatomethyltrimethoxysilane, 3-isocyanatopropyltrimethoxysilane, triethoxysilylundecanal, glycidoxymethyltrimethoxysilane, 3-glycidoxypropyltrimethoxysilane, (triethoxysilyl)methylsuccinic anhydride, 3-(triethoxysilyl)propylsuccinic anhydride, and 2-(4-chlorosulfonylphenyl)ethyltrimethoxysilane. Attachment of the amine reactive compound to the solid particles can also be accomplished by mixing an acid functional compound with solid particles having an appropriate surface functionality under conditions conducive to formation of an acid base complex, a hydrogen bonded complex, or an acid salt. Some fillers are commercially available and are already pre-treated with surface treating agents referred to as lubricants, or can be obtained with impurities that contain amine reactive groups such as carboxylic acid. In this way, component (iii) can be delivered together in the form of a treated filler. The advantage obtained in that instance is that the reaction between the organoborane amine complex and the amine reactive groups on the filler can help remove the lubricant from the surface of the filler particles. It may also be advantageous for the sake of stability to use a combination of fillers containing amine reactive groups, and fillers that are inert with respect to amine compounds.

Some representative and preferred examples of amine reactive groups useful (iii) include carboxylic acid, anhydride, isocyanate, aldehydes, and epoxies. Blocked isocyanates may be useful in cases where instead of ambient polymerization, it is desirable to use heat to initiate polymerization rapidly.

The Component Capable of Generating a Gas (iv)

Cured compositions can be prepared in the form of a porous foam by including in the curable composition (iv) a component capable of generating a gas. Such compositions typically contain a silicon hydride functional compound as the main component (iv), a compound bearing active hydrogen such as water, an alcohol, or carboxylic acid, and a co-catalyst such as platinum or tin. The co-catalyst facilitates the reaction of the silicon hydride and the compound bearing active hydrogen. Hydrogen gas is generated during the curing step and foam is generated. The foamed compositions can vary from flexible foams to rigid foams, depending on the particular silicon hydride, active hydrogen compound, and free radical polymerizable monomer, oligomer, or polymer that were used. The pore size distribution of the foam can be controlled by known methods of foam generation to tailor it relative to modulus, density, and permeability.

Optional Ingredients (v)

Some ingredients that can be included in the curable compositions herein include fillers such as reinforcing fillers, extending fillers, electrically conductive fillers, and thermally conductive fillers; adhesion promoters; crosslinking agents; combinations of polymers, crosslinkers and catalysts useful for providing a secondary cure of the matrix; polymers capable of extending, softening, reinforcing, toughening, modifying viscosity, or reducing volatility when mixed into the composition; spacers; dyes; pigments; UV stabilizers; aziridine stabilizers; void reducing agents; cure modifiers such as hydroquinone and hindered amines; free radical initiators such as organic peroxides and ozonides; organoborane-amine complexes not containing silicon in the organoborane portion of the complex; comonomers such as organic acrylates and methacrylates; polymers; diluents; rheology modifiers; acid acceptors; antioxidants; oxygen scavengers; oxygen sponges; oxygen release agents; oxygen generators; heat stabilizers; flame retardants; silylating agents; foaming agents; foaming catalysts; foam stabilizers; surfactants; wetting agents; solvents; diluents; plasticizers; fluxing agents; and dessicants.

In particular, some examples of electrically conductive fillers that can be used as an optional ingredient include metal particles, conductive non-metal particles, metal particles having an outer surface of a metal, or conductive non-metal particles having an outer surface of a metal. The outer surface metal can be silver, gold, platinum, palladium, nickel, aluminum, copper, or steel. Some examples of thermally conductive fillers that can be used as an optional ingredient include metal particles, metal oxide particles, thermally conductive non-metal powders, or combinations thereof. The thermally conductive filler can be aluminum, copper, gold, nickel, silver, alumina, magnesium oxide, beryllium oxide, chromium oxide, titanium oxide, zinc oxide, barium titanate, diamond, graphite, carbon nanoparticles, silicon nanoparticles, boron nitride, aluminum nitride, boron carbide, titanium carbide, silicon carbide, tungsten carbide, or combinations thereof.

Processing & Manufacturing

Curable composition according to the invention can be prepared by combining and mixing:

A. 1-100 parts by weight of (i) the free radical polymerizable monomer, oligomer or polymer;

B. 0.1-50 parts by weight of (ii) the organosilicon functional boron amine catalyst complex sufficient to cure the composition, the amount of B depending on the molecular weight of the complex and the number of boron atoms per molecule;

C. 0 to 50 parts by weight of (iii) the amine reactive compound having amine reactive groups sufficient to decomplex boron, the amount of C depending on the molecular weight of the compound;

D. 0 to 50 parts by weight of (iv) the component capable of generating a gas when mixed with a compound bearing active hydrogen and a catalyst; and E. 0 to 1000 parts by weight of one or more (v) optional ingredient; the parts by weight of A-E being based on the total weight of the curable composition.

The working time and extension of shelf stability of curable compositions of the invention can be controlled by introducing additional amine compounds to increase the molar ratio of the amine groups to boron atoms in the composition. The effective amount to be added depends on the amine:boron ratio used in component (ii). It is preferred that the overall amine:boron ratio remain sufficiently low to permit polymerization to occur. A suitable amine:boron ratio would be less than 10:1, preferably less than 4:1. When the amine reactive compound (iii) is already present in the curable composition, for example when residual carboxylic acid is present on filler particles, a higher level of amine compounds may be added to neutralize or partially neutralize the amine reactive groups for storage stability. The amine compound may contain mono-functional or multi-functional amine groups, and it can comprise a primary amine, secondary amine, and/or tertiary amine. The amine compound can contain free radical polymerizable groups or other functional group such as hydrolyzable groups. The amine reactive compound can be monomeric, oligomeric, or polymeric. Amine groups may be borne on an organic, organosilicon, or organopolysiloxane compound.

Composite articles according to the invention preferably comprise curable compositions that are disposed or applied to a single substrate or between multiple substrates. The substrate or substrates can be organic, thermoplastic, thermosetting, metallic, ceramic, or other suitable inorganic material. The substrates can be multi-layered substrates such as substrates used in printed circuit boards in which improved adhesion is desired between the curable compositions and the substrate or substrates of the composite article.

The composite articles can be made by bonding the curable composition to at least one surface of the substrate in the composite article. This can be carried out by curing the composition sufficiently to obtain adherence such that the curable composition and the substrate are bonded together securely to form the composite article.

For maximum benefit, the cure temperature should range from −40° C. to 80° C., preferably from 0° C. to 60° C., and more preferably from 15-35° C. The time for curing the composition on the substrate can range from 5 seconds to 24 hours, preferably from 30 seconds to 2 hours. This assures that the composition is sufficiently cured and fully adhered to the substrate. The curable composition can be applied to substrates by meter mixing, extruding, and/or the use of robotic or manual manipulation.

Fully bonded composite articles can be made by disposing the curable composition to at least one surface of a polymeric substrate at a temperature less than the boiling point of water (i.e., 100° C.), and then concurrently curing the curable composition and bonding it to the polymeric substrate(s). This obviates the need to pre-dry the substrate(s). Composite articles can also be cured and bonded in a similar fashion at room temperature, thus eliminating the need of a curing oven.

As noted above, the curable compositions can be easily packaged and delivered as multiple-component, multi-part adhesives. Combinations of components (i), (ii), and (iii) may be used as parts of multi-component, multi-part packages, provided components (ii) and (iii) are maintained separate from one another. For example, a portion of (i) the free radical polymerizable monomer, oligomer or polymer, and (ii) the organosilicon functional boron amine catalyst complex, can be packaged together in one part, while the remaining portion of (i) the free radical polymerizable monomer, oligomer or polymer, and (iii) the amine reactive compound, are packaged together in a second part. If desired, component (iii) can be delivered in the form of a filler treated with the amine reactive compound (iii), and packaged separately from (ii) the organosilicon functional boron amine catalyst complex. Components (i)-(iii) can also be stored together in 1-part formulations as long as oxygen is not present.

In the embodiment where the amine-reactive compound (iii) is borne on a filler and all the components are combined into a single package, it is necessary to mix, package, and store components (i), (ii) and (iii), in a substantially oxygen free environment, to avoid premature thickening.

In two part formulations, it may be advantageous for the sake of stability, to use a combination of fillers containing amine reactive groups and fillers that are inert with respect to amine compounds. For example, in a two part formulation, the filler that is inert with respect to amine compounds, can be combined with (ii) the organosilicon functional boron amine catalyst complex, while the filler bearing amine reactive groups, can serve as component (iii), and packaged in a separate container from component (ii). In that case, component (i) can be included with either part of the formulation, or with both parts. Alternatively, (iii) the amine reactive compound can be introduced under conditions allowing it to be delivered in the gas phase to a pre-mixed mold filled with a composition containing components (i) and (ii). This allows extended working time, followed by rapid curing upon exposure to air.

When the curable composition is to be used as a foam, it is desirable to isolate the compound bearing active hydrogen, i.e., the blowing agent, the catalyst, and the component capable of generating a gas from one another. The judicious positioning of these three components in multi-part packages provides improved storage stability.

Mixing and dispensing of multi-part packages can be performed in several ways. For example, the ingredients can be mixed at the desired volume ratio in air in a bag, or through a pressurized gun. The '512 patent describes several devices capable of mixing and dispensing two-part packages. It is also beneficial to tailor the viscosity and density of two-part packages to achieve efficient mixing and dispensing. Fillers of varying density and viscosity modifiers such as solvents, monomers, and polymers, can be used to impart control of these properties. In addition, it is beneficial to exclude oxygen from the environment in the mixing device before dispensing it on a substrate, to minimize pre-mature curing and plugging of the mixing and dispensing device. While there are no limitations on the mixing ratio between the components in multi-part packages, it is generally preferred to maintain volume ratios between 0.05:1 and 20:1, more preferably between 0.1:1 and 10:1 for two-part packages.

The curable compositions of the invention are useful for preparing rubbers; tapes; adhesives; protective coatings; thin films; electronic components; photonic components; acoustic dampening components; thermoplastic and thermosetting monolithic molded parts such as toys or auto-body panels; sealants; foams; gaskets; seals; o-rings; connectors; and pressure sensitive adhesives. Depending the choice of materials, cured compositions may range in properties from compliant gels to rigid resins. These curable compositions are especially useful for preparing self-adherent silicone elastomers and gels. Silicone elastomers and gels have numerous applications including their use as die attachment adhesives, lid sealants, encapsulants, gaskets, o-rings, potting compounds, and as conformal coatings. Silicone elastomers of the invention are capable of releasing from metal molds while at the same time adhering selectively to polymeric surfaces. Accordingly, the silicone elastomers can be co-molded or over-molded with polymeric resins in forming integrally bonded parts, such as connectors and housings for electrical wiring or electronic circuits, and diving masks for scuba diving. Silicone adhesives are useful for bonding electronic components to flexible or rigid substrates.

When an electrically conductive filler is used as an optional ingredient, it should be included in an amount sufficient to impart electrical conductivity to the curable composition. Curable compositions of this kind can be used for assembling electronic components, as substitutes for soldering, as electrical interface materials, and as conductive inks. The curable compositions can be delivered as rigid parts or flexible elastomers, and can be dispensed, pre-cured in rolls, or in sheet form as films, for application as pressure sensitive adhesives. They can also be dispensed and cured in place in some final applications. Foamed electrically conductive curable compositions can be used as gaskets and seals in applications such as in electrical and electronic housings, to prevent transmission of electromagnetic and radio frequency noise across sealed areas.

When a thermally conductive filler is used as an optional ingredient, it should be included in an amount sufficient to impart thermal conductivity to the curable composition. Thermally conductive curable compositions are similarly useful for preparing thermally conductive rubbers, thermally conductive tapes, thermally conductive curable adhesives, thermally conductive foams, and thermally conductive pressure sensitive adhesives. The curable compositions are especially useful for preparing thermally conductive silicone adhesives. Thermally conductive silicone adhesives have numerous applications including their use as die attachment adhesives, solder replacements, and thermally conductive coatings and/or gaskets. Thermally conductive silicone adhesives are especially useful for bonding electronic components to flexible and/or rigid substrates.

Thermally conductive curable compositions can also be used for assembling electronic components, as substitutes for soldering, as thermal interface materials, and as thermally conductive inks and/or greases. The curable compositions can be in the form of rigid parts or flexible elastomers, and can be pre-cured and dispensed in rolls or sheets as films, for application as pressure sensitive adhesives. They can also be dispensed wet and cured in place in final applications. Partially cured thermally conductive compositions can be used as thermally conductive greases. Foamed thermally conductive compositions can be used as gaskets and seals in electrical and electronic housings. When the curable composition is used as a thermally conductive adhesive, the curable composition is particularly useful as a thermal interface material, in that it is capable of providing good bonding strength between heat sinks, heat spreaders, or heat dissipation devices, especially where the heat sink or heat dissipation device has a polymeric matrix.

EXAMPLES

The following examples are set forth in order to illustrate the invention in more detail. Where number or weight average molecular weights are provided in these examples, the values were determined by gel permeation chromatography (GPC) using tetrahydrofuran as the solvent, and calibrated with mono-disperse polystyrene standards. Polydispersity indices for samples analyzed by GPC ranged from 1.4 to 2.2.

Example A

General Procedure for the Synthesis of Complexes

An organosilicon functional borane-amine catalyst complex was synthesized by the hydroboration of an allylsilane or a vinylsilane containing monomer, with $BH_3$-THF (tetrahydrofuran) in an oxgen free environment. A three neck round bottom flask, equipped with a magnetic stirring bar, a thermometer, a condenser, and a rubber septum, was charged with a solution of $BH_3$-THF, via a syringe and needle. The mixture was held at 0° C. An appropriate silane was then added, and the mixture was stirred for three hours at room temperature. The resulting hydroboration product was treated with from 0.5-1.5 molar equivalents of an appropriate amine compound, to form an air stable organosilicon functional borane-amine catalyst complex. The structure of the product was confirmed by $^1$H NMR and $^{11}$B NMR.

Example A1

Synthesis of a tri(trimethylsilylpropyl)-borane-aminosilane Catalyst Complex

In a three neck round bottom flask, equipped with a magnetic stirring bar, a thermometer, a condenser, and a rubber septum, was charged with 30 milliliters of a 1.0 molar $BH_3$-THF solution (0.03 mol) via a syringe and needle, and the mixture was cooled at 0° C. Three molar equivalents of allyltrimethylsilane (10.26 gram, 0.09 mol) was added to the mixture dropwise via a syringe and a needle, and the mixture was stirred for 3 hours at room temperature under a dry nitrogen purge. The resulting hydroboration product was treated under a dry nitrogen purged atmosphere with 1.2 molar equivalents of 3-aminopropyltrimethoxysilane. The THF was removed under reduced pressure to obtain an air stable organosilicon functional borane-amine catalyst complex. The reaction equation is shown below wherein k is equal to three.

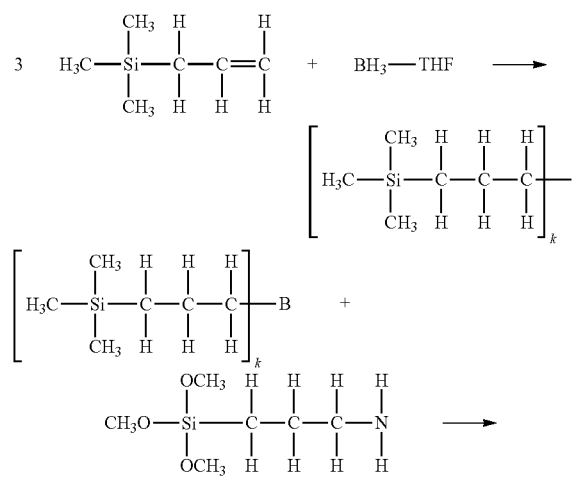

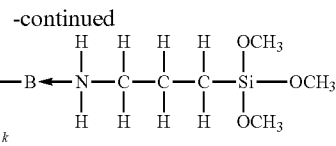

The following additional examples illustrate the invention in yet more detail.

Example A2

Synthesis of a tris(trimethylsilylpropyl)borane aminosiloxane Catalyst Complex

The hydroboration product prepared in Example A1 was treated under a dry nitrogen purged atmosphere with 0.3 molar equivalents of a 3-aminopropyldimethylsiloxy terminated polydimethylsiloxane (PDMS) oligomer. The oligomer had a number average molecular weight of 920 g/mol that provided a net amine:boron ratio of 0.6. THF was removed under reduced pressure to obtain an air stable organosilicon functional borane-amine catalyst complex.

Example A3

Synthesis of a tris(trimethylsilylpropyl)borane aminosilane Catalyst Complex

The hydroboration product prepared in Example A1 was treated under a dry nitrogen purged atmosphere with 1.2 molar equivalents of a 3-aminopropyltriethoxysilane. THF was removed under reduced pressure to obtain an air stable organosilicon functional borane-amine catalyst complex.

Example B

Preparation of Lap Shear Specimens and Measurement of Adhesion by Single Lap Shear Testing Cleaned substrates were placed in a machined aluminum support jig designed to support two three inch long substrate panels with an overlap area of one square inch, or 0.5 square inches, and a bond line thickness of 0.030 inches. The adhesive composition to be tested was applied to a first substrate with a microspatula. A second cleaned substrate was placed over the adhesive and compressed to form an appropriate thickness by lightly screwing down an upper restraining bar. Samples to be tested were allowed to cure at room temperature. After waiting between 14 and 16 hours, the test specimens were removed from the jigs, and all excess amounts of adhesive were trimmed away completely from the edges of the lap region with a razor blade. The samples were loaded into a MTS Sintech 5/G tensile tester available from the MTS Systems Corporation, Eden Prairie, Minn. The tensile tester was equipped with a 5000 pound force transducer and was tested at a crosshead speed of two inches per minute (in/min) (0.085 cm/second). Median values of maximum stress from at least three replicates of each substrate/composition combination were reported along with the mode of failure, rated by estimating the percentage of total bond area exhibiting cohesive failure (CF). If a fracture occurred through the silicone product that was very close to one of the substrate surfaces leaving only a thin film of residue, this effect was additionally noted as a thin film failure.

Example C

Measurement of Electrical Conductivity/Volume Resistivity

The electrical conductivity reported in the Examples below was determined as a volume resistivity measurement, using the standard protocol described in U.S. Pat. No. 6,361,716 (Mar. 26, 2002). Thus, the volume resistivity was determined using a Model 580 Micro ohm Meter of Keithley Instruments Incorporated, Cleveland, Ohio. The Meter was equipped with a four-point probe having spring loaded, gold plated, spherical tips. A test specimen was prepared by first placing two strips of Scotch brand tape 0.25 cm apart on a glass microscope slide, to form a channel extending along the length of the slide. An aliquot of the test curable composition was deposited at one end of the slide and over the channel. The curable composition to be analyzed was then spread over the entire channel by drawing a spatula through the curable composition and across the surface at an angle of approximately 45°. The test specimen was allowed to cure at room temperature overnight for about 16 hours. The voltage drop between the two inner probe tips was then measured at a selected current to provide a resistance value in ohms ($\Omega$).

The initial volume resistivity of the cured composition was calculated using the equation $V=R(W \times T/L)$ where V is the volume resistivity in ohm centimeters ($\Omega$-cm), R is the resistance in ohms ($\Omega$) of the cured composition measured between two inner probe tips spaced 2.54 centimeter apart, W is the width of the cured layer in centimeters, T is the thickness of the cured layer in centimeters, and L is the length of the cured layer between the inner probes in centimeters. The thickness of the cured layer was determined using an Ames Model LG 3500-0-04 thickness gauge made by Testing Machines Incorporated, Ronkonkoma, N.Y. Volume resistivity in $\Omega$-cm units represents the average value of five measurements each performed on identically prepared test specimens. These measurements have a relative error of less than 10 percent.

Example D

Transmission Electron Microscopy (TEM)

Cured samples were cryomicrotomed at −120° C. to make electron transparent thin sections for TEM analysis. The samples were loaded into a JEM 2100F TEM available from JEOL-USA Incorporated, Peabody, Mass. The morphology was investigated under bright field TEM mode at 200 KeV. To enhance the image contrast, a size 2 high contrast objective aperture was used. Digital images were taken using a CCD camera available from Gatan Incorporated, Pleasanton, Calif., that was attached under the TEM column, and analyzed with Gatan's Digital Micrograph software.

Example 1

A Polymer Solution was prepared by diluting 13.5 parts by weight of poly(methylmethacrylate) (PMMA) having a weight average molecular weight of 350,000 g/mol, and 6.5 parts by weight of PMMA having a weight average molecular weight of 996,000 g/mol, in 80 parts by weight of methyl methacrylate. A two part curable composition was then prepared by mixing as Part A1, 93 parts by weight of the Polymer Solution with 7 parts by weight of the organosilicon functional boron-amine catalyst complex of Example A3, in a Hauschild mixer for 10 seconds. In a separate container, Part B1 of the two part curable composition was prepared by mixing 90.9 parts by weight of the Polymer Solution with 9.1 parts by weight of acrylic acid, in a Hauschild mixer for 10 seconds. Equivalent weights of Parts A1 and B1 were mixed together by hand kneading in a sealed polyethylene bag for about 20 seconds. The resulting mixture was dispensed onto three 3 inch×1 inch×0.125 inch substrates made of polyethylene terephthalate (PET). The substrates were reinforced with 30 weight percent of glass filler, and tested according to the method described in Example B1. The adhesive joints all supported stresses in excess of 600 pounds per square inch (psi), with an average 670±20 psi, before being terminated by failure, i.e., breakage, of the PET substrate. This example shows that the organosilicon functional borane amine catalyst of the invention can be used for curing organic free radical polymerizable compounds such as acrylic adhesives, in addition to organosilicon-based materials of subsequent examples; and that it is useful for curing acrylic type adhesives.

Comparative Example 1

To 93.3 parts of a methacryloxypropyldimethylsiloxy terminated PDMS having a number average molecular weight of 950 g/mol, was added 4.2 parts of a catalyst. The catalyst was tri-n-butyl borane complexed with 1.4 molar equivalents of isophoronediamine. The mixture was thoroughly homogenized in a Hauschild mixer for 10 seconds prior to adding 2.5 parts of isophorone diisocyanate. The mixture was then remixed for 10 seconds after purging the headspace briefly with nitrogen. Upon opening the lid to expose the mixed composition to air, a monolithic disc of cured material formed within 20 seconds. The cured material was opaque. Transmission electron micrographs of this sample were analyzed by the method described in Example D.

Example 2

To 93.3 parts of a methacryloxypropyldimethylsiloxy terminated PDMS having a number average molecular weight of 950 g/mol, was added 4.2 parts of the catalyst prepared in Example A2. The mixture was thoroughly homogenized in a Hauschild mixer for 10 seconds prior to adding 2.5 parts of isophorone diisocyanate. The mixture was then remixed for 10 seconds after purging the headspace briefly with nitrogen. Upon opening the lid to expose the mixed composition to air, a monolithic disc of cured material formed within 15 seconds. The cured material was transparent. Transmission electron micrographs from a cross-section of this sample were analyzed by the method described in Example D.

The opacity of the cured material in Comparative Example 1 indicates that a typical organoborane amine complex catalyst yields an incompatible material. In contrast, the transparency of the cured material in Example 2 indicates that the resulting material did not exhibit phase separation in bulk when an organosilicon functional boron amine catalyst complex of the invention was used. These results were verified microscopically. The cured material of Example 2 did not show any discrete spherical microdomains or light areas from microphase separated methacrylate crosslink points. The cured material of Comparative Example 1 however, did show discrete spherical microdomains as light areas from microphase separated methacrylate crosslink points. The size of these spherical microdomains ranged from 10-80 nanometer (nm) in diameter. Additionally, Comparative Example 1 exhibited larger, irregularly shaped heterogeneous methacrylate-rich particles ranging from 100-400 nm in size. Thus, the catalyst of the invention provides a more uniform phase behavior to the siloxane based curable compositions of the invention.

Comparative Example 2

A hydrosilylation curable adhesive composition was prepared by mixing together the following ingredients:
(i) 28 parts by weight of an organopolysiloxane resin containing $CH_2=CH(CH_3)_2SiO_{1/2}$ units, $(CH_3)_3SiO_{1/2}$ units, and $SiO_{4/2}$ units. The mole ratio of the $CH_2=CH(CH_3)_2SiO_{1/2}$ units and the $(CH_3)_3SiO_{1/2}$ units combined to the $SiO_{4/2}$ units was 0.7. The resin had a weight average molecular weight of 22,000, a polydispersity of 5, and contained 1.8 percent by weight (5.5 mole percent) of vinyl groups.
(ii) 72 parts by weight of a dimethylvinylsiloxy terminated PDMS having a viscosity of 55 Pa·s at 25° C.
(iii) 32.3 parts by weight of ground quartz having an average particle size of 5 µm.
(iv) 0.14 part by weight of a catalyst containing one percent by weight of a platinum (IV) complex of 1,1-diethenyl-1,1,3,3-tetramethyl disiloxane, 92 percent by weight of a dimethylvinylsiloxy terminated PDMS having a viscosity of 0.45 Pa·s at 25° C., and 7 percent by weight of tetramethyldivinyldisiloxane.
(v) 1.50 parts by weight of a mixture of 50 percent by weight of 3-glycidoxypropyltrimethoxysilane and 50 percent by weight of a hydroxy terminated methylvinylsiloxane polymer with a mixture viscosity of 15 centistoke at 25° C.
(vi) 0.30 part by weight of carbon black.
(vii) 3.96 parts by weight of a trimethylsiloxy terminated poly(dimethylsiloxane/methylhydrogensiloxane) polymer having an average of three dimethylsiloxane units and five methylhydrogensiloxane units per molecule, and containing 0.8 percent by weight of silicon bonded hydrogen atoms.
(viii) 0.21 part by weight of 3,5-dimethyl-1-hexyn-3-ol.

The adhesive composition was de-aired to remove any entrained air for 20 minutes at a reduced pressure of 2 mm of mercury. The adhesive composition was cast onto a 3 inch×1 inch×0.125 inch glass filled polybutylene terphthalate substrate, and cured for one hour on a hot plate having a linear thermal gradient ranging from about 90-170° C. over the length of the sample. The location at which the cured composition changed from a liquid to a non-flowable elastomeric solid was determined by probing the surface of the sample with a spatula, and then wiping away any uncured material. This position on the sample was correlated to a minimum cure temperature for a given heating time, using a linear regression analysis of the steady state temperature profile obtained from a thermocouples implanted in the hot plate surface at evenly spaced distances along the thermal gradient.

Example 3

A first Part A was prepared by combining (i) 42.8 parts by weight of a hydroxydimethylsilyl terminated PDMS having a number average molecular weight of 44,000 g/mol; (ii) 42.8 parts by weight of a methacryloxypropyldimethylsilyl terminated PDMS having a number average molecular weight of 13,000 g/mol; (iii) 5.0 parts by weight of an aminopropyldimethylsilyl terminated PDMS having a number average molecular weight of 920 g/mol; (iv) one part by weight of dibutyltindilaurate; and (v) 8.5 parts by weight of the organosilicon functional boron amine catalyst complex prepared in Example A2. A twelve second mixing cycle on a Hauschild mixer followed the addition of each of ingredients (i)-(v). In a second container, a second Part B was prepared by combining (vi) 91.4 parts by weight of a methacryloxypropyldimethylsilyl terminated PDMS having a number average molecular weight of 13,000 g/mol; (vii) 3.2 parts by weight of isophoronediisocyanate; and (viii) 5.0 parts by weight of methacryloxypropyltrimethoxysilane. A twelve second mixing cycle on a Hauschild mixer followed the addition of each of ingredients (vi)-(viii).

Two parts by weight of each of Parts A and B were then combined in a polyethylene bag and mixed by kneading the outside of the bag. Films approximately 0.03-0.04 inches thick were cast onto Mylar film substrates with a doctor blade and allowed to cure at room temperature (25±2° C.). Curing was tested by probing the cured material of the film with a spatula until the material solidified. The ambient time to gelation was defined as the time needed for the material to cease being flowable at room temperature. The minimum cure temperature/time was defined as the time under ambient conditions at which the material was fully cured with no evidence of wetness at the surface or substrate interface.

Comparative Example 3

To 99.77 parts by weight of the platinum cured adhesive composition prepared in Example 3 was added 0.023 parts by weight of N-(2-aminoethyl)-3-aminopropyltrimethoxysilane. The mixture was homogenized in a Hauschild mixer for 24 seconds. The curable composition was de-aired to remove entrained air for 20 minutes at a reduced pressure of 2 mm mercury. The composition was cured and evaluated in the same manner as the composition prepared in Comparative Example 2.

Example 4

To Part B of the composition prepared in Example 3 was added 0.44 parts by weight of N-(2-ethylamino)-3-aminopropyltrimethoxysilane. This composition was then mixed with an equal amount of Part A of the composition prepared in Example 3, The composition was tested in the same manner as in Example 3. The test results of the several examples is shown in Table 1.

TABLE 1

| Example | Primary Amine Added | Ambient Time to Gelation | Minimum Cure Temperature/Time |
| --- | --- | --- | --- |
| Comparative Example 2 | None | >6 months | 105° C./1 hour |
| Comparative Example 3 | 320 ppm | >6 months | >170° C./1 hour |
| Example 3 | None | 3 minutes | 25° C./<16 hours |
| Example 4 | 320 ppm | 2.5 minutes | 25° C./<16 hours |

Table 1 shows that Comparative Example 2 requires heat curing of the platinum cured silicone elastomer, and that Comparative Example 3 is sensitive to cure inhibition by amine compounds. In contrast, Table 1 shows that in Examples 3 and 4, the elastomeric silicone composition cured with the organosilicon functional boron amine catalyst complex of the invention at room temperature, and that it was not strongly inhibited by the presence of the same level of an amine compound.

Comparative Example 4

A two part siloxane resin composition was prepared by mixing in one container a Part A' that contained (i) 47.6 parts by weight of a resin having a structure corresponding to $M_{0.3}D(Ph)_{0.5}T(methacryloxypropyl)_{0.2}$; and (ii) 3.9 parts by weight of a catalyst containing tri-n-butyl borane complexed with 0.6 molar equivalents of a 3-aminopropyldimethylsiloxy-terminated polydimethylsiloxane oligomer. The oligomer had a number average molecular weight of 920 g/mol, and a number average molecular weight of 745 g/mol. In a separate container, a Part B' was prepared by mixing (iii) 47.6 parts by weight of the same resin used in Part A', and (iv) 0.82 parts by weight of isophorone diisocyanate. The ingredients in each of Part A' and Part B' were mixed for 10 seconds in a Hauschild mixer. Equal weights of Part A' and Part B' were then mixed together in a polypropylene mixing cup for 10 seconds in a Hauschild mixer. The composition gelled within 50 seconds and yielded a hard solid that had a cloudy appearance.

Example 5

To 11.7 parts by weight of a methacryloxypropyl dimethylsilyl terminated polydimethylsiloxane having a number average molecular weight ($M_n$) of about 13,000, was added 82.9 parts by weight of a fatty acid lubricated silver flake filler (RA-127) from American Chemet Corporation, Chicago, Ill. The two materials were mixed in a Hauschild mixer for 24 seconds. 5.4 parts by weight of the organosilicon functional boron amine catalyst complex prepared in Example A1 was added to the mixture. The headspace of the mixing cup was purged with nitrogen gas and then mixed for two 24 second mixing cycles. Upon exposing the sample to ambient air, the material crosslinked and became non-flowable within 5 minutes. Using the method described in Example C, the cured material was found to have a volume resistivity of 7.7 E-03±0.6 E-03 Ω-cm when tested 24 hours after casting the sample. Hence, the organosilicon functional boron amine catalyst complexes of the invention can be seen as being useful as catalysts in the preparation of conductive materials such as electrically conductive siloxanes.

Example 6

A two part siloxane resin composition was prepared in the same manner as in Comparative Example 4 except that 3.4 parts by weight of the oraganosilicon functional boron amine catalyst complex of Example A2 was substituted for the catalyst used in Part A'. The composition gelled within 20 seconds and formed a hard solid that was transparent. This example shows that the organosilicon functional boron amine catalyst complexes of the invention are useful as catalysts for curing organopolysiloxane resins. Further, when compared with the cured composition in Comparative Example 4, the improved transparency of the cured product of Example 6 shows that the organosilicon functional boron amine catalyst complexes of the invention are capable of reducing phase separation in organopolysiloxane resin matrices.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A composition comprising (i) a free radical polymerizable monomer, oligomer or polymer; (ii) an organosilicon functional boron amine catalyst complex having an organosilicon functional organoborane portion containing at least one silicon atom, the silicon atom being present in the organosilicon functional organoborane portion of the complex as a silicon atom containing group, a siloxane oligomer containing group, or as a siloxane polymer containing group; and optionally, (iii) an amine reactive compound having amine reactive groups.

2. A composition according to claim 1 wherein the free radical polymerizable monomer, oligomer, or polymer (i) is an organic compound (a); a mixture of mono-functional or multi-functional organic compounds (b); an organosilicon monomer, oligomer, or polymer (c); a mixture of mono-functional or multi-functional organosilanes (d); a mixture of mono-functional or multi-functional organopolysiloxanes (e); or a mixture of (a)-(e); in which (a)-(e) are unsaturated and capable of undergoing free radical polymerization.

3. A composition according to claim 1 in which the complex comprises a compound having the formula:

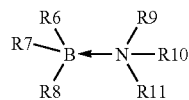

wherein B represents boron; R6, R7, and R8 are groups independently selected from the group consisting of hydrogen; a cycloalkyl group; a linear or branched alkyl group having 1-12 carbon atoms on the backbone; an alkylaryl group; an organosilane group; an organosiloxane group; an alkylene group capable of functioning as a covalent bridge to a boron atom; a divalent organosiloxane group capable of functioning as a covalent bridge to a boron atom; and halogen substituted homologues thereof; with the provisos that at least one of the R6, R7, or R8 groups contains one or more silicon atoms, and the silicon-containing group is covalently bonded to boron; R9, R10, and R11 are a group that yields an amine compound or a polyamine compound capable of complexing boron; and wherein two or more of the R6, R7, or R8 groups, and two or more of the R9, R10, or R11 groups, are such that they can combine to form heterocyclic structures, provided the sum of the number of atoms from the two combining groups does not exceed 11.

4. A composition according to claim 3 in which the complex is attached to solid particles.

5. A composition according to claim 1 wherein the amine reactive compound having amine reactive groups (iii) is a compound having amine reactive groups and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides.

6. A composition according to claim 5 wherein the amine reactive groups are borne by an organosilane, an organopolysiloxane, an organotitanate, or an organozirconate.

7. A composition according to claim 5 wherein the amine reactive compound (iii) is attached to solid particles.

8. A composition according to claim 1 further comprising a component capable of generating a gas (iv) when mixed with a compound bearing active hydrogen and a catalyst, the component capable of generating a gas being a silicon hydride functional compound; the compound bearing active hydrogen being water, an alcohol, or a carboxylic acid; and the catalyst being platinum, a platinum group metal, tin, titanium, or zirconium.

9. A composition according to claim 1 wherein the free radical polymerizable monomer, oligomer or polymer (i), the organosilicon functional boron amine catalyst complex (ii), and the amine reactive compound (iii) are packaged together in one part in a substantially oxygen free environment.

10. A composite article of manufacture comprising a substrate coated with the composition according to claim 1.

11. A composite article of manufacture according to claim 10 wherein the composition on the substrate is cured.

12. A composite article of manufacture comprising two or more substrates coated with the composition according to claim 1, and the composition is disposed between the substrates as a bond line of a fixed or a varying thickness.

13. A composite article of manufacture according to claim 12 wherein the composition disposed between the substrates is cured.

14. An article of manufacture comprising a rubber, tape, adhesive, protective coating, thin film, electronic component, photonic component, acoustic dampening components, thermoplastic monolithic molded part, thermosetting monolithic molded part, sealant, foam, gasket, seal, o-ring, connector, or pressure sensitive adhesive wherein a component thereof is the cured product of the composition according to claim 1.

15. An article of manufacture according to claim 14 in which the cured product of the composition has properties ranging from a compliant gel to a rigid resin.

16. An article of manufacture according to claim 15 in which the cured product is a self-adherent silicone elastomer or a self-adherent silicone gel.

17. An article of manufacture according to claim 16 in which the cured product is a die attachment adhesive, a lid sealant, an encapsulant, a potting compound, a conformal coating, or an electronic component bonded to a flexible or rigid substrate.

18. A method of curing the composition according to claim 1 comprising applying the composition to a substrate, between multiple substrates, or to a mold; and exposing the composition to the amine reactive compound in the gas phase.

19. A method according to claim 18 wherein the amine reactive compound is a compound capable of generating amine reactive groups when exposed to ultraviolet radiation.

20. A method according to claim 19 wherein the composition further comprises a photosensitizing compound.

\* \* \* \* \*